United States Patent Office 3,606,476
Patented Sept. 20, 1971

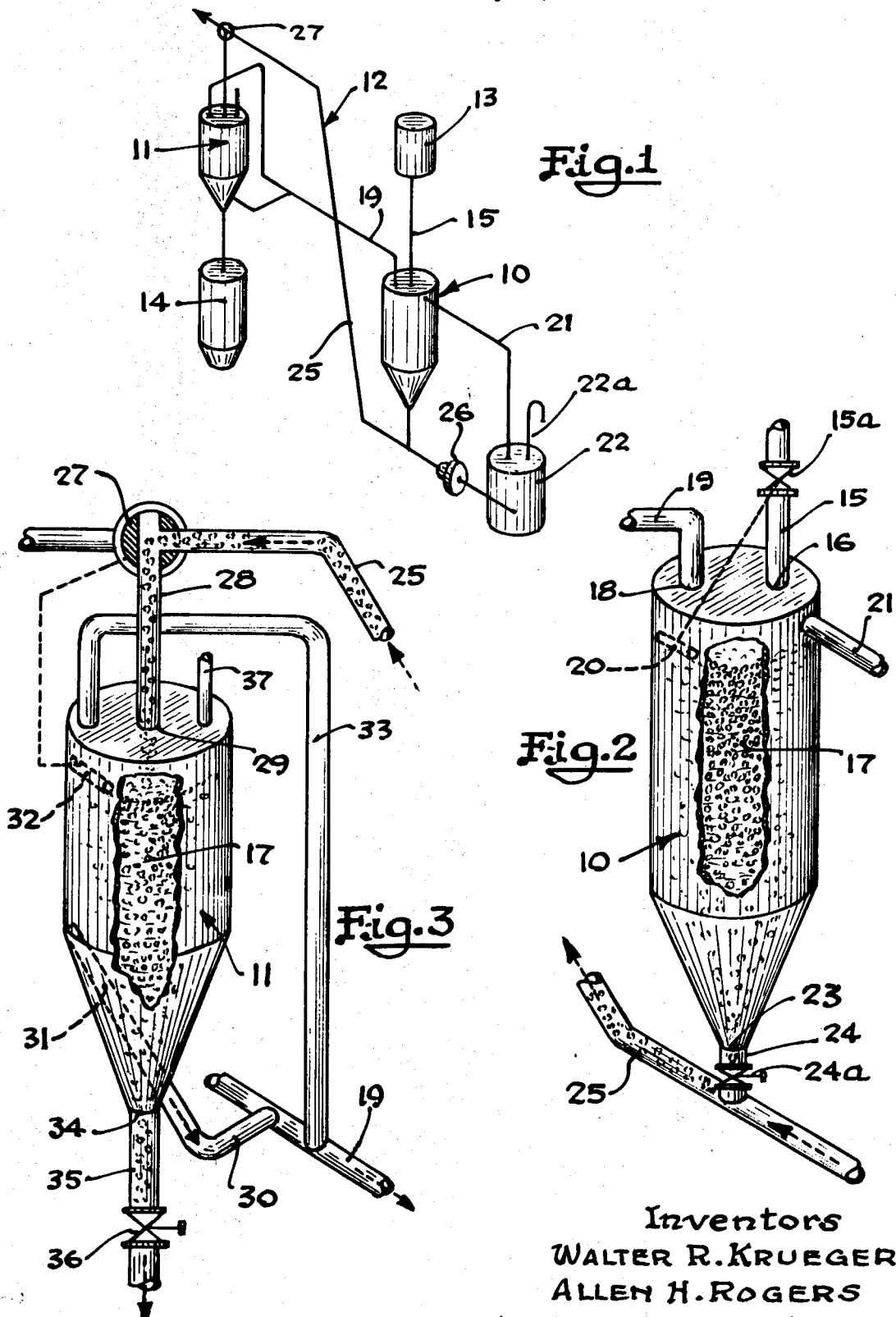

3,606,476
FLUIDIZED LEAD SHOT CONVEYER
Walter R. Krueger and Allen H. Rogers, Lake Jackson, Tex., assignors to Nalco Chemical Company, Chicago, Ill.
Filed July 24, 1970, Ser. No. 58,000
Int. Cl. B65g 53/30
U.S. Cl. 302—14
9 Claims

ABSTRACT OF THE DISCLOSURE

A conveyer for transporting lead shot from a lead shot manufacturing facility to an electrolytic cell lead shot hopper includes a feed vessel receiving lead shot and an organic liquid for wetting the lead shot, and an outlet for the vessel. The wetted lead shot is gravitationally fed from the vessel outlet into a main pipeline being charged with the organic liquid under pump pressure to fluidize the lead shot and move it in the pipeline to the cell hopper. A drain is provided in the hopper for removing the liquid from the lead shot, and an outlet at the bottom of the hopper allows the lead shot to be discharged into the cell.

---

This invention relates in general to a lead shot conveyer, and more particularly to a lead shot conveyer system where the lead shot is fluidized and transported within a sealed pipeline from a vessel to a hopper that thereafter feeds the lead shot into an electrolytic cell.

The present invention is especially useful in plants where lead shot is made and used, such as in plants where organo-metallic compounds are produced, and more particularly systems where a liquid electrolyte is electrolyzed in an electrolytic or electrochemical cell using a sacrificial anode in the form of lead shot. A typical electrochemical cell such as shown in U.S. Pat. No. 3,368,961, is employed for the manufacture of tetralkyl lead compounds or other organo-metallic compounds where a solution of Grignard reagent is electrolyzed in the presence of a sacrificial anode in the form of lead shot. Any number of cells may be used in the system, as well as a facility for making lead shot consumed by the cells. It is necessary to periodically charge the electrolytic cell or cells with lead shot, thereby requiring a method and apparatus of transporting lead shot from the point of manufacture to the cell or cells in the system. The lead shot is advantageously manufactured in a location somewhat remote from the electrolytic cells.

Heretofore, lead shot has been conveyed from the point of manufacture to the electrolytic cells by mechanical conveyers of the drag link type wherein the lead shot is first wetted with a liquid to facilitate movement in troughs or channels through which a drag link conveyer pushes the wetted shot to its use destination. This conveying arrangement has resulted in inefficiencies since the troughs or channels are not liquid tight and loss of liquid is encountered. Further, deformation of the lead shot is encountered in the use of the drag link conveyer system. Finally, since the drag link conveyer system requires the wetted lead shot to be open to the atmosphere, surface oxydation of the lead takes place during the conveying operation.

The fluidized lead shot conveyer of the present invention, being liquid and air-tight, overcomes the difficulties heretofore encountered and above mentioned in preventing the loss of the wetting liquid during the transporting of the lead shot, in substantially eliminating the deformation of the lead shot, and in preventing the surface oxydation of the lead shot. It can then be appreciated that the present invention enhances and materially improves the overall efficiency of manufacturing organo-metallic compounds.

It is therefore an object of the present invention to provide a new and improved system for conveying lead shot in plants manufacturing organo-metallic compounds.

It is a further object of the present invention to provide a fluidized lead shot conveyer that eliminates the loss of liquid used in wetting of the lead shot, that substantially eliminates the deformation of lead shot, and that prevents surface oxydation of lead shot, all of which together materially increases the efficiency of a plant manufacturing organo-metallic compounds.

Other objects, features and advantages of the invention will be apparent from the following detailed disclosure, taken in conjunction with the accompanying sheets of drawings, wherein like reference numerals refer to like parts, in which:

FIG. 1 is a schematic flow diagram of the conveyer system according to the invention;

FIG. 2 is a diagrammatic partially sectional view of the lead shot feed vessel utilized in the conveyer of the invention; and FIG. 3 is a diagrammatic partially sectional view of a lead shot hopper for an electrolytic cell as used in the present invention.

The conveying system of the invention includes a feed vessel receiving lead shot from a lead shot making facility and in which the lead shot is initially wetted with an organic liquid that is used in the conveying process. The wetted lead shot is discharged into a main pipeline being continually supplied with organic liquid to fluidize the lead shot and to pump same to discharge outlets leading to cell hoppers. A liquid supply tank or reservoir, having a suction line with a pump therein that is connected to the main pipeline, continually receives liquid recovered from the hoppers. Recovery is obtained by draining the liquid from the lead shot in the hoppers and feeding same to a return header connected to the feed vessel. The excess liquid not needed in the lead vessel for wetting the lead shot, is returned to the tank through an overflow line. The main pipeline and the other liquid lines are liquid and air-tight, thereby facilitating the handling of the lead shot and the recovery of the liquid.

Referring now to the drawings and particularly to FIG. 1, the fluidized lead shot conveyer is illustrated as including generally a lead shot feed vessel 10 into which lead shot and an organic liquid are received to set the lead shot, an electrolytic cell lead shot hopper 11 into which the fluidized lead shot is received, and a closed pipeline system 12 in which the lead shot is fluidized and transported from the vessel 10 to the hopper 11. It will be appreciated that any number of hoppers may be connected to the pipeline system 12, one for each of the electrolytic cells in the plant where the conveyor system is installed. The purpose of the conveyer system is to transport lead shot from a lead shot manufacturing facility 13 to an electrolytic cell 14, wherein the manufacturing facility 13 is somewhat remotely located relative to the electrolytic cell 14.

The feed vessel 10 is arranged relative to the manufacturing facility 13 so that it receives the lead shot gravitationally through a pipe or conduit 15 which is connected from the discharge of the faciilty 13 to an inlet 16 at the upper end of the vessel 10. A valve 15a is provided in the pipe 15 to control the flow of lead shot to the vessel 10.

An organic liquid, such as polyether, is added to the lead shot at the feed vessel 10, thereby wetting the lead shot within the vessel 10, the lead shot being indicated by the numeral 17. The organic liquid is introduced at an inlet 18 at the upper end of the vessel which is connected to a liquid return header 19.

A high level detector 20 of a suitable type is provided adjacent the upper end of the vessel 10 to detect the upper level of the lead shot and prevent it from being overfilled by controlling the operation of the valve 15a and the introduction of the lead shot through the pipe 15 from the facility 13. Any suitable type of detector arrangement may be used, such as electrical conductivity probe means. At a point slightly above the high level detector 20, a liquid overflow pipe 21 allows the excess organic liquid to drain into a liquid suction tank or reservoir 22. An air vent 22a is provided on the tank.

The vessel 10 is provided with a discharge or outlet 23 at its bottom end for discharging wetted lead shot into a pipe 24 that connects into the main pipeline 25. A valve 24a is provided in pipe 24 to coact with high level indication in hopper 11 and any other cell hopper to control the rate at which lead is conveyed. The main pipeline 25 is connected to a liquid supply line and the discharge end of a pump 26, the suction end of which is connected to a suction line of the suction tank 22. The pump may be of the centrifugal or other suitable type. Valving is provided along the main pipeline 25 at the location of each and every cell hopper, and as particularly shown in FIG. 3, the valve means 27 controls discharge of the fluidized lead shot from the main pipeline to a connecting conduit 28 leading to an inlet 29 in the upper end of the hopper 11. The valve means 27 is three-way to allow the flow of fluidized shot to be discharged to the cell 14 or to be directed there beyond to other cells. The organic liquid is separated from the lead shot in the hopper 11 and discharged from the hopper through drain line 30 and into the liquid return header 19 to return the liquid to the vessel 10. Suitable screen means 31 is provided within the hopper 11 to prevent the lead shot from passing into the drain line 30.

The upper level of the fluidized lead shot 17 in the hopper 11 is controlled by the high level detector 32 in the same manner as the detector 20 operates with respect to the vessel 10. Preferably, the detector 32 upon detecting a high level of lead shot, will operate valve 24a to stop lead feed through pipeline 24. When lead shot has cleared pipeline 25, valve 27 operates to direct subsequent lead flow down pipeline 25 to other cells and prevent the lead flow into the loaded cell hopper. A liquid overflow pipe 33 at the upper end of the hopper 11 permits excess liquid not otherwise discharged through drain line 30 to be drained off and returned to the liquid return header 19.

While not shown, it should be appreciated that if no cell hopper on the main pipeline 25 is calling for lead shot, controls would be provided to stop the pump 26. Alternately, a bypass arrangement could be provided.

Lead shot free of the organic liquid is thereafter discharged from the hopper 14 through the outlet 34 into a line 35 that is connected to the inlet of the electrolytic cell 14 through a suitable valve 36, it being appreciated that the lead shot is gravitationally discharged from the hopper 11 to the electrolytic cell 14. In order to prevent oxygen from entering the electrolytic cell, a nitrogen or other non-reactive atmosphere is maintained within the hopper 11 by the gas pad system connection 37.

Other suitable valving and instrumentation (not shown) may be provided as necessary to control the movement of the fluidized lead shot throughout the system. The valves employed are preferably Teflon lined plug valves, although any suitable valve type may be employed.

From the foregoing, it can be appreciated that the lead shot is conveyed in a fluid bed, thereby eliminating the possibility of deforming the lead shot during movement from the manufacturing facility to the electrolytic cell. Moreover, the pipeline connections eliminate the possibility of losing the organic fluid used in wetting of the lead shot for conveying same, as well as eliminating the exposure of the lead shot to the atmosphere and the surface oxydation that would be caused thereby. Thus, the organic fluid used in wetting and fluidizing the lead shot is recoverable. The system is liquid-tight and no moving parts are utilized in the conveyance of the lead shot. Accordingly, it can be appreciated that more efficient operation of the overall organo-metallic manufacturing plant is obtained.

It will be understood that modifications and variations may be effected without departing from the scope of the novel concepts of the present invention, but it is understood that this application is to be limited only by the scope of the appended claims.

We claim:

1. A fluidized lead shot conveyer for transporting lead shot from a lead shot manufacturing facility to an electrolytic cell comprising:
   a feed vessel, lead shot inlet means at the top of the vessel for introducing lead shot into said vessel from said facility, liquid inlet means at the top of the vessel for introducing an organic liquid into the vessel to wet the lead shot, and an outlet in the bottom of the vessel for discharging wetted lead shot therefrom,
   a cell hopper positioned above an electrolytic cell having an inlet at the upper end adapted to receive fluidized lead shot and an outlet at the bottom for deliverying lead shot to the cell,
   main pipeline means interconnecting the outlet of the vessel to the inlet of the cell hopper,
   a liquid supply tank,
   pumping means for pumping organic liquid from said tank into said main pipeline means to fluidize the lead shot and pump it therethrough to the cell hopper,
   a drain line in said cell hopper for draining the liquid from the lead shot therein and recovering same,
   pipeline means between the outlet of the cell hopper and an inlet to the cell,
   and valve means in said last pipeline means controlling lead shot flow therethrough to the cell.

2. A fluidized lead shot conveyer as defined in claim 1, wherein a return header is connected between the drain line of the cell hopper and the liquid inlet means of the feed vessel to return all recovered liquid through the feed vessel, and an overflow line is connected between the top of the feed vessel and said liquid supply tank to return liquid not used in wetting the lead shot to the tank.

3. A fluidized lead shot conveyer as defined in claim 2, and an overflow line connecting the top of the cell hopper and the return header to handle any excess liquid in the cell hopper not recoverable through the drain line.

4. A fluidized lead shot conveyer as defined in claim 3, and valve means in said feed vessel lead shot inlet means for controlling the flow of lead shot into the vessel.

5. A fluidized lead shot conveyer as defined in claim 4, and means in the feed vessel detecting the lead shot level therein to control said valve means and prevent overloading thereof with lead shot.

6. A fluidized lead shot conveyer as defined in claim 5, and feed vessel valve means between said feed vessel and said main pipeline means for controlling the flow of lead shot into the main pipeline means and the rate at which lead is conveyed.

7. A fluidized lead shot conveyer as defined in claim 6, and hopper valve means between the main pipeline means and the inlet to the cell hopper controlling the flow of fluidized lead shot to said cell hopper.

8. A fluidized lead shot conveyer as defined in claim 7, and means in the cell hopper detecting the lead shot level therein to control said fed vessel valve means and said hopper valve means and prevent overloading thereof with lead shot.

9. A fluidized lead shot conveyer as defined in claim 7, and means for supplying an inert or non-reactive gas to said cell hopper to prevent oxygen from entering the cell.

References Cited

UNITED STATES PATENTS

| | | | |
|---|---|---|---|
| 1,908,220 | 5/1933 | Chapman | 302—14 |
| 2,391,863 | 1/1946 | Bowen | 302—53 |
| 3,547,809 | 12/1970 | Ehrlich et al. | 302—14 |

ANDRES H. NIELSEN, Primary Examiner

U.S. Cl. X.R.

302—15